United States Patent
Hotaling et al.

(10) Patent No.: US 9,884,462 B2
(45) Date of Patent: Feb. 6, 2018

(54) FLEXIBLE MIDDLE LAYER FOR RFID PATCH ON TIRES

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: Elizabeth Hotaling, Peidmont, SC (US); Jay Clifford Sinnett, Greenville, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 621 days.

(21) Appl. No.: 14/532,587

(22) Filed: Nov. 4, 2014

(65) Prior Publication Data

US 2015/0047782 A1  Feb. 19, 2015

Related U.S. Application Data

(62) Division of application No. 13/318,206, filed as application No. PCT/US2009/049072 on Jun. 29, 2009, now abandoned.

(51) Int. Cl.
*B60C 23/04* (2006.01)
*B29D 30/00* (2006.01)
(Continued)

(52) U.S. Cl.
CPC .......... *B29D 30/0061* (2013.01); *B32B 37/12* (2013.01); *B32B 38/00* (2013.01);
(Continued)

(58) Field of Classification Search
CPC .......... B29D 30/061; B29D 2030/0072; B29D 2030/0077; B29D 2030/0083;
(Continued)

(56) References Cited

U.S. PATENT DOCUMENTS

| 4,694,875 A | 9/1987 | Goebel |
| 5,181,975 A * | 1/1993 | Pollack ............... B60C 23/0493 |
| | | 152/152.1 |

(Continued)

FOREIGN PATENT DOCUMENTS

| EP | 1870262 A2 | 12/2007 |
| KR | 20080046816 A | 5/2008 |

(Continued)

OTHER PUBLICATIONS

Hysol US1151. Datasheet [online]. Henkel AG & Company, 2007 [retrieved on Feb. 12, 2014]. Retrieved from the Internet: <URL: https://tds.us.henkel.com//NA/UT/HNAUTTDS.nsf/web/CD714963EDD80547852571CA004ADFD8/$File/HYSOL%20US1151-EN.pdf>.*

(Continued)

*Primary Examiner* — Robert Dye
(74) *Attorney, Agent, or Firm* — Dority & Manning, P.A.

(57) ABSTRACT

A tire mountable apparatus and a method of fabricating a tire mountable apparatus is disclosed. The tire mountable apparatus includes a first layer, a second layer and a middle layer disposed between the first layer and the second layer. The tire mountable apparatus further includes an electrical device embedded in the middle layer of the tire mountable apparatus. The middle layer of the tire mountable apparatus completely surrounds the electrical device and is formed from a potting compound, The potting compound does not require exposure to heat, air, moisture, or light to clue and does not require solvent evaporation or outgassing of reac- (Continued)

tion products to cure. The tire mountable apparatus may be constructed by curing the potting compound between the first layer and the second layer.

14 Claims, 3 Drawing Sheets

(51) Int. Cl.
*B32B 37/12* (2006.01)
*B32B 38/00* (2006.01)
*B29K 21/00* (2006.01)
*B29K 105/24* (2006.01)
*B29L 9/00* (2006.01)
*B29L 31/34* (2006.01)

(52) U.S. Cl.
CPC .. *B60C 23/0493* (2013.01); *B29D 2030/0077* (2013.01); *B29D 2030/0083* (2013.01); *B29K 2021/00* (2013.01); *B29K 2105/246* (2013.01); *B29L 2009/00* (2013.01); *B29L 2031/3481* (2013.01); *B32B 2037/1253* (2013.01); *B32B 2038/0076* (2013.01)

(58) Field of Classification Search
CPC ............ B29D 30/0061; B60C 23/0491; B60C 23/0493; B29C 66/433; B29C 70/685; B29C 2043/181; B29C 2043/182
See application file for complete search history.

(56) References Cited

U.S. PATENT DOCUMENTS

| | | | |
|---|---|---|---|
| 5,562,787 A * | 10/1996 | Koch | ................. B60C 23/0493 152/152.1 |
| 5,786,626 A | 7/1998 | Brady et al. | |
| 6,462,650 B1 | 10/2002 | Balzer et al. | |
| 6,613,609 B1 | 9/2003 | Laviron et al. | |
| 2004/0159383 A1 | 8/2004 | Adamson et al. | |
| 2005/0126668 A1 | 6/2005 | Fornerod et al. | |
| 2005/0128086 A1 | 6/2005 | Brown et al. | |
| 2006/0038665 A1 | 2/2006 | Jang | |
| 2006/0049949 A1 | 3/2006 | Jurs et al. | |
| 2006/0123899 A1 * | 6/2006 | Nakao | ................. B60C 23/0493 73/146 |
| 2008/0192451 A1 | 8/2008 | Sinnett et al. | |
| 2009/0079545 A1 | 3/2009 | Chow et al. | |

FOREIGN PATENT DOCUMENTS

| | | |
|---|---|---|
| KR | 2008077456 A | 8/2008 |
| KR | 20080077425 A | 8/2008 |
| WO | WO 2011/002440 | 1/2011 |

OTHER PUBLICATIONS

Patent Cooperation Treaty. "International Search Report". PCT/US2009/049072 dated Aug. 12, 2009.

* cited by examiner

FLEXIBLE MIDDLE LAYER FOR RFID PATCH ON TIRES

FIELD OF THE INVENTION

The present subject matter relates to a tire mountable apparatus and to a method of manufacturing a tire mountable apparatus. More specifically, the present subject matter relates to a tire mountable apparatus having an RFID tag or other electrical device embedded in a flexible middle layer of the tire mountable apparatus and to a method for constructing the same.

BACKGROUND OF THE INVENTION

The incorporation of electrical devices with tire structures has been shown to yield many practical advantages, such as asset tracking and measurement of physical parameters including, for example, temperature and pressure. Many systems utilize radio frequency communication or wireless communication systems between the tire and an external monitoring or interrogating device. Such wireless communication systems often include a RFID tag for communication between an electrical device and the external monitoring or interrogating device.

RFID tags and other electrical devices may be mounted to a tire in a tire mountable apparatus, such as for example an RFID patch. These patches may be constructed with, for instance, two layers of rubber or polymeric material that surround an RFID tag or other electrical device. Stresses over time caused by the RFID tag or other electrical device during, for example, tire rotation may create openings and tears in the rubber or polymeric patch layers Such openings are undesirable because they may, for instance, admit water or other substances into the patch which could cause damage to the RFID tag or other electrical device.

U.S. Pat. No. 7,292,138 discloses a vehicle tire with an RFID tag.

U.S. Patent Application Publication No. 2004/0159383 discloses a method for embedding a radio frequency antenna in a tire, and an antenna for embedding in a tire.

U.S. Patent Application Publication No, 2008/0192451 discloses a robust mounting for an RFID antenna.

U.S. Patent Application Publication No. 2009/0079545 discloses a flexible RFID tag device and method for constructing same.

The disclosures of all of the foregoing United States patent and published patent applications are hereby fully incorporated into this application for all purposes by reference thereto. While various implementations of RFID tags and other electrical devices in tires have been developed, and while various methods of mounting the RFID tags and other electrical devices to a tire have been implemented, no design has emerged that generally encompasses all of the desired characteristics as hereafter presented in accordance with the subject technology.

SUMMARY OF THE INVENTION

According to one exemplary embodiment of the present invention, a tire mountable apparatus is disclosed. The tire mountable apparatus includes a first layer, a second layer and a middle layer disposed between the first layer and the second layer. The tire mountable apparatus further includes an electrical device embedded in the middle layer of the tire mountable apparatus. The middle layer of the tire mountable apparatus completely surrounds the electrical device and is formed from a potting compound. The potting compound does not require exposure to heat, air, moisture or light and does not require solvent evaporation or outgassing of reaction products to cure.

According to another exemplary embodiment of the present invention, a method of fabricating a tire mountable apparatus is disclosed. The method includes mixing a potting compound and placing the potting compound on a first layer of uncured material to form a middle layer. The method further includes coating an electrical device in the potting compound and placing the electrical device in the middle layer. The method further includes placing a second layer of uncured material on top of the middle layer and curing the middle layer between the first layer and the second layer to form the tire mountable apparatus. The potting compound does not require exposure to heat, air, moisture or light and does not require solvent evaporation or outgassing of reaction products to cure.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
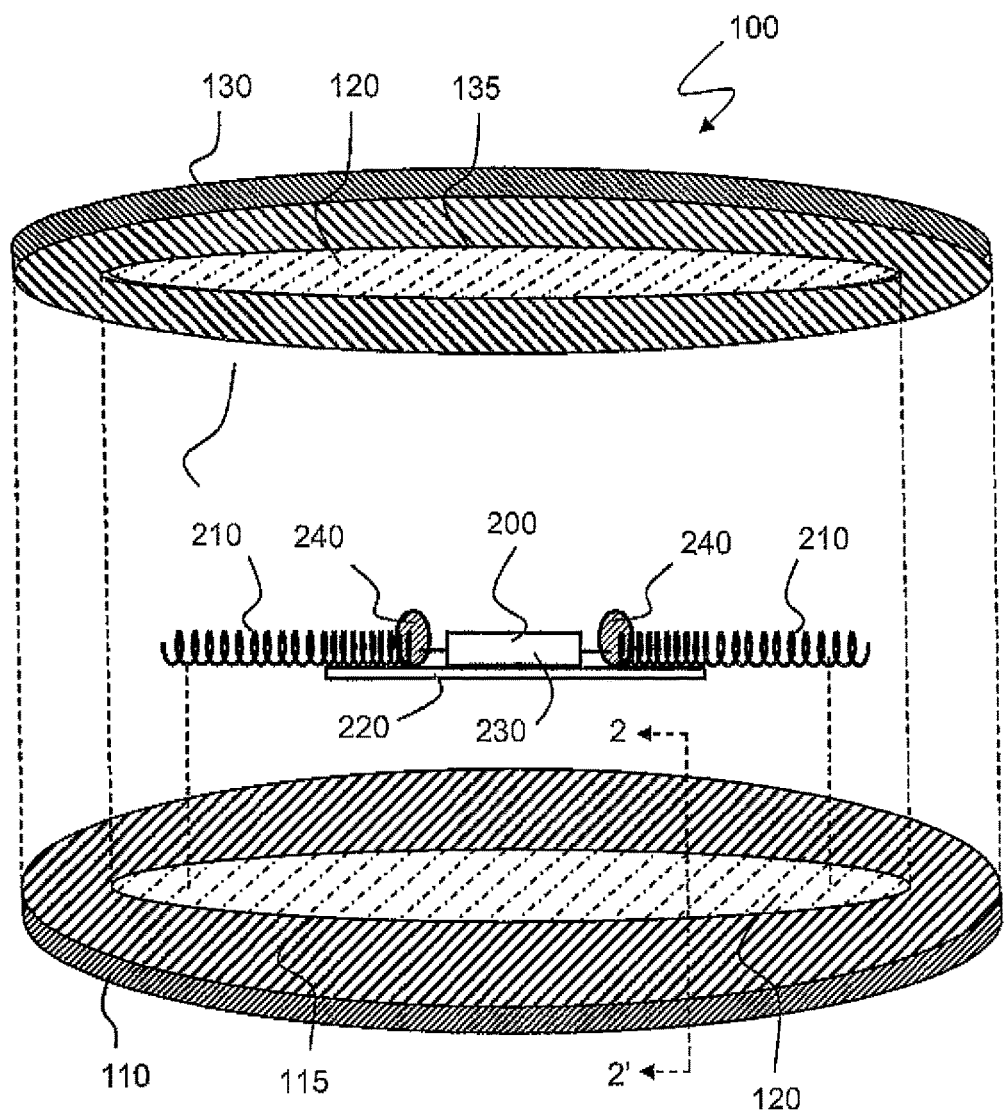
FIG. 1 provides an exploded view of a tire mountable apparatus according to one exemplary embodiment of the present invention.

Repeat use of reference characters throughout the present specification and appended drawings is intended to represent same or analogous features or elements of the invention.

DETAILED DESCRIPTION OF THE PREFERRED EMBODIMENTS

Reference will now be made in detail to embodiments of the invention, one or more examples of which are illustrated in the drawings. Each example is provided by way of explanation of the invention. For example, features illustrated or described as part of one embodiment can be used with another embodiment to yield still a third embodiment.

It is intended that the present invention include these and other modifications and variations.

In general, the present technology is directed to a useful apparatus that can be mounted in a tire structure. The apparatus may be used to secure an RFID tag or other electrical device to the tire structure. The RFID tag or other electrical device is embedded in a flexible middle layer of the tire mountable apparatus to provide many useful advantages, including enhanced mechanical protection and stability.

Figure 2:
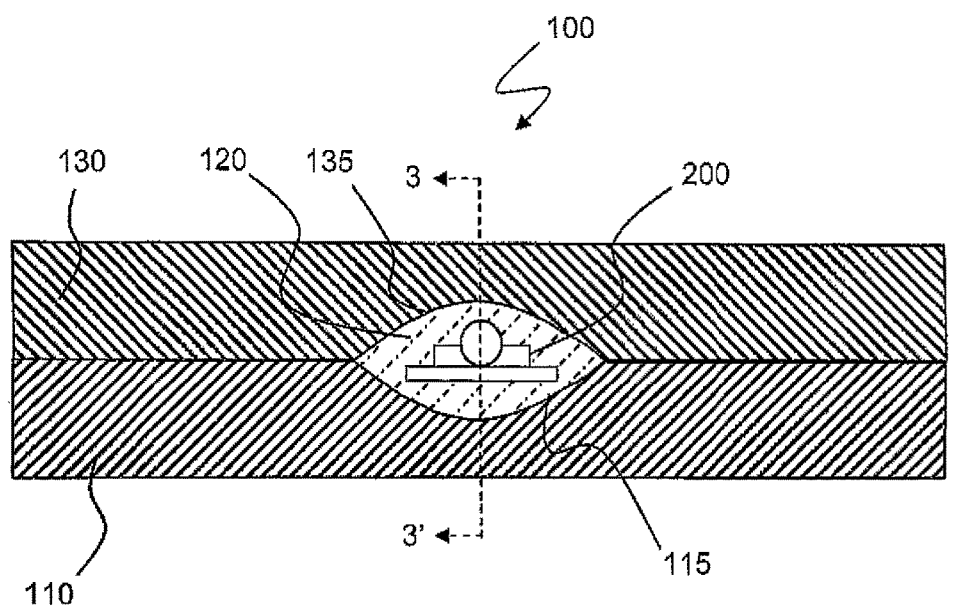
FIG. 2 provides a cross-sectional view of the exemplary tire mountable apparatus shown in FIG. 1 in an assembled state taken along line 2-2' of FIG. 1.
Figure 3:
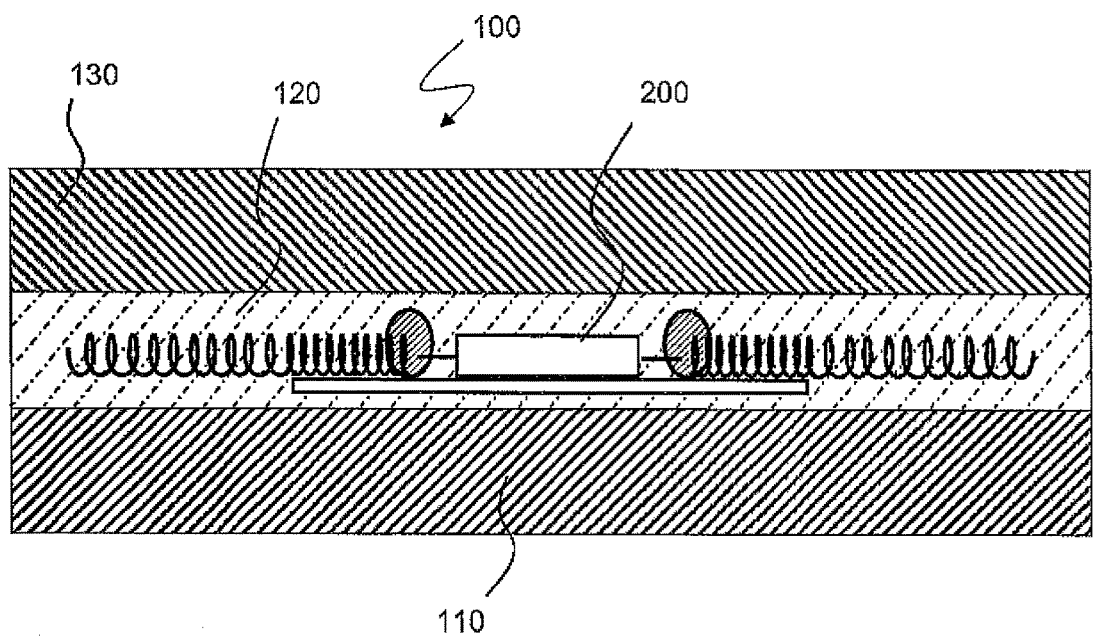
FIG. 3 provides a cross-sectional view of the exemplary tire mountable apparatus depicted in FIG. 2 taken along line 3-3' of FIG. 2.

Referring to FIGS. 1-3, an exemplary tire mountable apparatus constructed according to one exemplary embodiment of the present invention will now be discussed in detail. As illustrated in FIGS. 1-3, the tire mountable apparatus 100 includes a first layer 110, a second layer 130 and a middle layer 120 disposed between the first layer 110 and the second layer 130. Embedded in the middle layer 120 is an RFID tag 200. While an RFID tag 200 is illustrated in FIGS. 1-3, those of ordinary skill in the art, using the teachings provided herein, should readily appreciate that the tire mountable apparatus of the present technology may be used to secure and protect any electrical device or component without deviating from the scope or spirit of the present invention.

RFID transponder or tag 200 is an electrical device that may be used to wirelessly transmit data to a remote receiver and/or to receive data from a remote transmitter by way of an antenna 210. The exemplary antenna 210 of the RFID tag shown FIG. 1 includes coiled wires. While various methods of connection may be utilized without deviating from the present invention, the coiled wires 210 are connected to an RFID component 220 via a soldered connection 240. The soldered connection 240 may be used to establish an electrical connection between antenna 210, RFID component 230, and printed circuit board 220. RFID component 230 may contain electrical components for the wireless transmission and reception of data. Printed circuit board 220 may contain a variety of electrical components or devices that perform various advantageous functions, such as, for example, the monitoring of temperature and pressure for the tire.

As will be discussed in more detail below, the RFID tag 200 is placed into a groove 115 formed on the first layer 110. Middle layer 120 is formed in the groove 115 of first layer 110. As can be seen in FIG. 2, a second layer 130 with groove 135 may be placed on top of the first layer 110 and middle layer 120 so that the first layer 110 and the second layer 130 define a pocket surrounding the middle layer 120 and the RFID tag 200. The middle layer 120 completely surrounds the RFID tag to provide various advantageous results.

First layer 110 may be formed from any insulating material, such as, for example, a rubber material or a polymeric material. The material of the first layer 110 preferably is selected for good adhesion to a tire structure and should have a modulus of elasticity and hardness comparable to tire compounds. For example, the cured hardness of the first layer may be in the range of about 25 to about 85 Shore A. In addition, the material of the first layer 110 may be selected so that it is not damaged by chemicals exuded by the tire structure.

In one exemplary embodiment, the first layer 110 may be composed of a material similar to the skim rubber used in a bonding layer of a repair patch. In this exemplary embodiment, the first layer has a special curing chemistry that allows it to cure at room temperature, with no pressure, when a special curing agent is applied to it. While the material is curing, if it is in contact with already-cured rubber (a tire), the curing process actually links the bonding rubber to the rubber of the tire structure at a molecular level, creating a stronger bond than almost all adhesives. Moreover, this exemplary material is permanently flexible, unlike most adhesives. Even in the uncured state, this exemplary material is at least a semi-solid so it can be handled and shipped without being cured.

Second layer 130 may also be formed from any insulating material, such as, for example, a rubber material or polymeric material. The material of the second layer 130 may be identical to that of the first layer 110 or may be different from the material of the first layer 110. Preferably, the material of the second layer 130 has characteristics that make it suitable for protecting the tire mountable apparatus 100 from the environment and has a modulus of elasticity and hardness similar to that of tire compounds. For example, the cured hardness of the second layer may be in the range of about 25 to about 85 Shore A. Similar to first layer 110, second layer 130 may be composed of a material similar to the skim rubber used in a bonding layer of a repair patch.

The material of the first and second layers 110 and 130 respectively may have both a cured and an uncured state. For instance, the material of the first and second layers 110, 130 may initially comprise uncured rubber. After a curing process, the material of the first layer and second layers 110, 130 may comprise cured rubber. In particular embodiments, the first and second layers 110 and 130 are secured together to form a bond between the materials of first layer 110 and second layer 130.

As illustrated in FIGS. 1-3, the tire mountable apparatus 100 includes a middle layer 120 disposed between the first layer 110 and second layer 130. This middle layer 120 may be disposed between the entire top surface of the first layer 110 and bottom surface of the second layer 130, or may be confined to a pocket defined by the first layer 110 and second layer 130. FIGS. 2 and 3 illustrate the middle layer 120 being confined to pocket defined by grooves 115 and 135 of first layer 110 and second layer 130 respectively. The RFID tag 200 is embedded in the middle layer 120 formed between the first layer 110 and second layer 130. The first layer 110 and second layer 130 are bonded to each other around the perimeter of the pocket out to the edge of the tire mountable apparatus 100.

According to one aspect of the present technology, the middle layer 120 is formed from a potting compound. Use of the term "potting compound" herein is intended to refer to any of a variety of electrically insulating potting compounds or encapsulating compounds, including, but not limited to, epoxies, silicones, and urethanes. Potting compounds typically have an uncured state and a cured state. While in an uncured state, a potting compound may have a liquid, semi-liquid, or gel-like form so that it can be used to coat, for example, the RFID tag 200. In the cured state, the potting compound hardens and forms an adhesive bond between components coated or in contact with the potting compound.

The potting compound may be any of a variety of epoxies, urethanes, and silicones. Preferably the potting compound is configured to adhere to the first and second layers 110 and 130, as well as to the various components of the RFID tag 200, such as, for example, FR4, brass, and solder. The viscosity of the potting compound in an uncured state is preferably such that the potting compound can flow around RFID tag 200 or other electrical device or such that RFID tag 200 or other electrical device can be dipped into the potting compound to become coated by the potting compound. For example, the potting compound may have a viscosity in the range of about 800 mPa·s to about 1400 mPa·s at about 25° C. when the potting compound is in an uncured state.

In particular embodiments, the potting compound should be configured to cure between first layer 110 and second layer 130. In this embodiment, the potting compound should not require exposure to heat, light, air or moisture to cure. In addition, the potting compound should preferably not require solvent evaporation or the outgassing of reaction products during the curing process. In another particular embodiment, the potting compound should be able to cure at room temperature.

The cured hardness of the middle layer 120 may be in the range of about 10 to about 70 Shore A, such as about 15 to about 60 Shore A. In one exemplary embodiment, the cured hardness of the potting compound may be less than the cured hardness of the first and second layers 110, 130. In this embodiment, the second layer 130 must be sufficiently resistant to high shear displacements in the middle layer 120. In another exemplary embodiment, the first layer 110, second layer 130, and middle layer 120 all have substantially equal cured hardness. This embodiment provides consistent elasticity throughout the tire mountable apparatus 100, preventing concentration of forces on the interfaces between adjacent layers of the tire mountable apparatus 100. In yet another exemplary embodiment, the middle layer 120 has a hardness greater than either of the surrounding layers. This provides a kind of gradient of hardness from the outside of the tire mountable apparatus 100—which is relatively soft—to the electrical device inside—which is typically very rigid.

In another exemplary embodiment, the first layer 110 and the second layer 130 may have different cured hardness. For example, the cured hardness of the first layer 110 may be less than the cured hardness of the second layer 130. As another example, the cured hardness of the first layer 100 may be greater than the cured hardness of the second layer 130. In this particular embodiment, the cured hardness of the middle layer 120 may be intermediate between the cured hardness of the first layer 110 and the cured hardness of the second layer 130. This provides a graduated or tapered series of forces and displacements between the tire and the RFID tag 200, minimizing the concentration of forces at any particular layer of the tire mountable apparatus 100.

In one exemplary embodiment, the middle layer 120 comprises a Hysol®—US2651™ potting compound manufactured by Henkel. This exemplary potting compound is formed by mixing two separate compounds into a mixed potting compound. The mixed potting compound in an uncured state has a density at 25° C. of about 0.9 g/cm³ and a viscosity at 25° C. of about 1000 mPa·s. The mixed potting compound can cure at room temperature. Once cured, the potting compound has a Glass Transition Temperature of about −60° C., a coefficient of linear expansion of about 197 ppm/° C., and a hardness of about 15 Shore A. The cured potting compound has a dielectric strength of about 1,050 volts/mil for a 20 mils thickness. The dielectric constant for the cured potting compound is about 4.7 at 1 kHz and about 4.5 at 100 kHz.

In another exemplary embodiment, the middle layer 120 comprises a Hysol® US1151™ potting compound manufactured by Henkel. This exemplary potting compound is formed by mixing two separate compounds into a mixed potting compound. The mixed potting compound in an uncured state has a density at 25° C. of about 1.0 g/cm³ and a viscosity at 25° C. of about 1200 mPa·s. The mixed potting compound can cure at room temperature. Once cured, the potting compound has a Glass Transition Temperature of about −40° C., and a hardness of about 15 Shore A. The cured potting compound has a dielectric strength of about 1,040 volts/mil for a 20 mils thickness. The dielectric constant for the cured potting compound is about 4.87 at 100 Hz, about 4.76 at 1 kHz, and about 4.39 at 100 kHz.

Referring still to FIG. 1-3, the middle layer 120 is disposed between the first layer 110 and the second layer 130. As illustrated, the RFID tag 200 is embedded in the middle layer 120 such that the RFID tag is completely surrounded by the middle layer 120. This exemplary construction of a tire mountable apparatus provides many advantages.

For instance, the middle layer 120 holds the electrical components of the RFID tag 200 in a relatively fixed location and assists in maintaining the overall configuration and shape of the RFID tag 200, even when the tire mountable apparatus experiences centrifugal forces caused by rotation of the tire. The middle layer 120 further provides mechanical and chemical protection to the RFID tag 200 by preventing exposure of the tag to various hazards, including curb scrub, water, snow, sand, moisture, and corrosive chemicals. In addition, the arrangement of the tire mountable apparatus 100, along with the flexibility of first and second layers 110, 130 and middle layer 120, allows for normal flexing of the tire mountable apparatus 100 during tire rotation while minimizing strain caused by tire flexing during rotation. Finally, the middle layer 120 provides electrical isolation between the RFID tag 200 and first and second layers 110 and 130. The RFID tag 200 cannot function efficiently if it is in direct contact with high carbon rubber that is typical of many tire sidewalls. The middle layer 120 provides an insulating barrier between the RFID tag 200 and the tire to avoid such inefficiencies.

Figure 4:
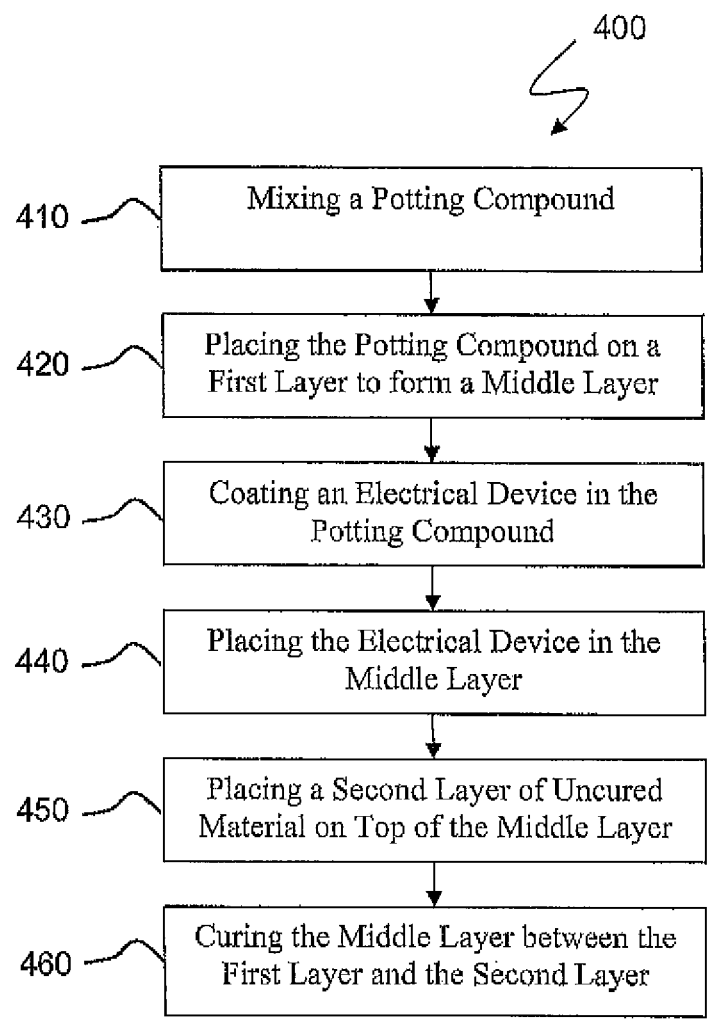
FIG. 4 depicts exemplary steps of a method according to one exemplary embodiment of the present invention.

With reference now to FIG. 4, the exemplary steps associated with one exemplary method 400 according to the present invention will now be discussed. At step 410, the method 400 includes mixing a potting compound. The potting compound may have any of the features or combination of features of the potting compounds discussed herein. For example, the potting compound may have a viscosity in the range of about 800 mPa·s to about 1400 mPa·s at about 25° C. when the potting compound is in an uncured state and may have a cured hardness of about 10 to 70 Shore A, such as about 15 to about 60 Shore A.

Once the potting compound has been mixed, at step 420, the potting compound is placed on a first layer of uncured material to form a middle layer. The layer of uncured material may be formed from any insulating material, such as, for example, a rubber material or a polymeric material. For example, in one embodiment the first layer of uncured material may comprise an uncured rubber material.

At step 430, the method 400 includes coating an electrical device, such as an RFID tag, in the potting compound. When the potting compound is in an uncured state, the potting compound may have a viscosity such that the potting compound can flow around the electrical device. In a particular embodiment, the potting compound may have viscosity such that the step of coating an electrical device can include dipping the electrical device in the potting compound. In another embodiment, the electrical device may simply be moved in the potting compound that has already been placed on the first layer of uncured material. For example, the electrical device may be rotated in the middle layer of potting compound placed onto the first layer of uncured material at step 420.

As shown in step 440, once the electrical device is coated in the potting compound, the electrical device is placed in the middle layer such that the middle layer completely surrounds the electrical device. A second layer of uncured material is then placed on top of the middle layer as shown at step 450. Similar to the first layer of uncured material, the second layer of uncured material may be formed from any insulating material, such as, for example, a rubber material or a polymeric material. For example, in one embodiment the second layer of uncured material may comprise an uncured rubber material.

In a particular embodiment, the second layer may be placed over the middle layer so that the middle layer is sealed in a pocket defined by the first layer and the second layer. In this embodiment, the first layer may be bonded to the second layer around the perimeter of the pocket defined by the first layer and the second layer. In this embodiment, it is preferable that the potting compound does not require exposure to heat, light, air or moisture to cure. In addition, the potting compound should preferably not require solvent evaporation or the outgassing of reaction products during the curing process.

Finally, once the second layer has been placed on top of the middle layer, the method 400 includes at step 460 curing the middle layer between the first layer and the second layer to form the tire mountable apparatus. Once the tire mountable apparatus has been constructed in accordance with the exemplary embodiments disclosed herein, the tire mountable apparatus may, be stored, shipped, and later mounted on to a tire structure. At that time, the first and second layers may be cured at room temperature by the application of a chemical curing agent. In this case, the process of curing while in contact with the tire creates a desirable strong adhesive bond between the tire mountable apparatus and the tire.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of constructing a tire mountable apparatus, comprising:
    mixing a potting compound;
    placing said potting compound on a first layer of uncured material to form a middle layer, said first layer comprising a rubber material;
    coating an electrical device in said potting compound;
    placing said electrical device in said middle layer such that said electrical device is completely surrounded by said middle layer;
    placing a second layer of uncured material on top of said middle layer, said second layer comprising said rubber material; and
    curing said middle layer between said first layer and said second layer to form said tire mountable apparatus, said first and second layers and said middle layer all having a substantially equal cured hardness;
    wherein said potting compound does not require exposure to heat, air, moisture, or light to cure and does not require solvent evaporation or outgassing of reaction products to cure.

2. The method of claim 1, wherein said electrical device comprises an RFID tag.

3. The method of claim 1, wherein said step of coating said electrical device in said potting compound comprises dipping said electrical device in said potting compound.

4. The method of claim 1, wherein said step of coating said electrical device in said potting compound comprises moving said electrical device in said potting compound placed on said first layer of uncured material.

5. The method of claim 1, wherein said potting compound has a viscosity in the range of about 800 mPa·s to about 1400 mPa·s at about 25° C. when said potting compound is in an uncured state, and said potting compound has a hardness in the range of about 10 to about 70 Shore A when said potting compound is in a cured state.

6. The method of claim 1, wherein said method comprises sealing said middle layer in a pocket defined by said first layer and said second layer.

7. The method of claim 1, wherein said method further comprises bonding said tire mountable apparatus to a tire structure.

8. A method of constructing a tire mountable apparatus, comprising:
    mixing a potting compound;
    placing said potting compound on a first layer of uncured material to form a middle layer, said first layer comprising a rubber material having a cured hardness in the range of about 25 to about 85 Shore A;
    coating an electrical device in said potting compound;
    placing said electrical device in said middle layer such that said electrical device is completely surrounded by said middle layer;
    placing a second layer of uncured material on top of said middle layer, said second layer comprising a rubber material having a cured hardness that is less than or greater than the cured hardness of said first layer; and
    curing said middle layer between said first layer and said second layer to form said tire mountable apparatus, said middle layer having a cured hardness that is in the range between the cured hardness of the first layer and the cured hardness of the second layer;
    wherein said potting compound does not require exposure to heat, air, moisture, or light to cure and does not require solvent evaporation or outgassing of reaction products to cure.

9. The method of claim 8, wherein said electrical device comprises an RFID tag.

10. The method of claim 8, wherein said step of coating said electrical device in said potting compound comprises dipping said electrical device in said potting compound.

11. The method of claim 8, wherein said step of coating said electrical device in said potting compound comprises moving said electrical device in said potting compound placed on said first layer of uncured material.

12. The method of claim 8, wherein said potting compound has a viscosity in the range of about 800 mPa·s to about 1400 mPa·s at about 25° C. when said potting compound is in an uncured state, and said potting compound has a hardness in the range of about 10 to about 70 Shore A when said potting compound is in a cured state.

13. The method of claim 8, wherein said method comprises sealing said middle layer in a pocket defined by said first layer and said second layer.

14. The method of claim 8, wherein said method further comprises bonding said tire mountable apparatus to a tire structure.

\* \* \* \* \*